(12) United States Patent
Gu

(10) Patent No.: US 10,940,908 B1
(45) Date of Patent: Mar. 9, 2021

(54) TOOL ASSEMBLY FOR BICYCLE

(71) Applicant: Cyclingdeal USA Inc., Pomona, CA (US)

(72) Inventor: Haidong Gu, Pomona, CA (US)

(73) Assignee: CYCLINGDEAL USA INC., Pomona, CA (US)

( * ) Notice: Subject to any disclaimer, the term of this patent is extended or adjusted under 35 U.S.C. 154(b) by 0 days.

(21) Appl. No.: 16/591,317

(22) Filed: Oct. 2, 2019

(51) Int. Cl.
*B62J 9/40* (2020.01)
*B29C 73/08* (2006.01)
*B25B 27/00* (2006.01)
*B62J 9/21* (2020.01)

(52) U.S. Cl.
CPC ............. *B62J 9/40* (2020.02); *B25B 27/0071* (2013.01); *B29C 73/08* (2013.01); *B62J 9/21* (2020.02)

(58) Field of Classification Search
CPC ........... B62J 9/40; B62J 9/21; B25B 27/0071; B29C 73/08
See application file for complete search history.

(56) References Cited

U.S. PATENT DOCUMENTS 5,251,341 A * 10/1993 Seals ...................... B25B 13/00
7/138

* cited by examiner

*Primary Examiner* — Corey N Skurdal
(74) *Attorney, Agent, or Firm* — Guice Patents PLLC

(57) ABSTRACT

A tool assembly includes a connector and a tool device. The connector has a main member and a driving member, wherein the main member has an expanding portion, and the expanding portion is driven by the driving member. The tool device, which is connected to the connector, has a tool. The connector and the tool device are intended to be received in a handlebar of a bicycle, and the expanding portion presses the handlebar when the expanding portion is enlarged by the driving member to fix the tool assembly to the handlebar.

8 Claims, 6 Drawing Sheets

TOOL ASSEMBLY FOR BICYCLE

BACKGROUND OF THE INVENTION

1. Technical Field

The present invention relates generally to an accessory of a bicycle, and more particularly to a tool assembly which is carried on a bicycle.

2. Description of Related Art

In early days, bicycles are one type of the vehicles for transportation. However, more and more people ride bicycle for exercise and casual activity. Typically, a conventional bicycle includes a frame, a front and a rear wheels connected to the frame, a handlebar connected to a fork which is connected to the front wheel to be held by a cyclist to control a moving direction of the bicycle, and a transmission assembly, including a pair of pedals, a crank arm, a chain ring, a chain, and a cogset, to be powered by the cyclist to make the bicycle to move.

The last thing the cyclists want to meet is the bicycle malfunctioned on the road. The commonest problem of the bicycles is flat tire. The bicycle with flat tire cannot be ridden anymore unless you want to break the rim. When you have a flat tire the only thing you can do it move your bicycle off the road and get help unless you have tools to fix the flat tire. It is a problem to the cyclist because there is no suitable place to store these tools on the bicycle.

BRIEF SUMMARY OF THE INVENTION

In view of the above, the primary objective of the present invention is to provide a tool assembly for bicycle, which is able to be stored in a suitable place of a bicycle without changing the structure of the bicycle.

In order to achieve the objective of the present invention, a tool assembly, which is stored in a handlebar of a bicycle, includes a connector and a tool device. The connector has a main member and a driving member, wherein the main member has an expanding portion, and the expanding portion is driven by the driving member to change a diameter thereof. The tool device, which is connected to the connector, has a tool.

The connector and the tool device are intended to be received in the handlebar, and the expanding portion presses the handlebar when the expanding portion is enlarged by the driving member to fix the tool assembly to the handlebar.

In an embodiment, the tool assembly further includes a cap detachably connected to the tool device to receive the tool therein.

In an embodiment, the expanding portion of the connector includes a plurality of flexible plates, which are extendable to enlarge the diameter of the expanding portion.

In an embodiment, each of the flexible plates is provided with a recess.

In an embodiment, the driving member of the connector includes a bolt and a nut; the bolt is connected to the main member, and a threaded shank of the bolt extends to a space within the flexible plates. The nut is received in the space and abutted against the flexible plates. The nut engages the threaded shank of the bolt, so that the nut is moved related to the threaded shank to extend the flexible plates when the bolt is turned.

In an embodiment, each of the flexible plates has an inclined surface at an inner side thereof which makes a diameter of the space within the flexible plates gradually narrowed.

In an embodiment, the main member of the connector has a flange at an end thereof, and the flange is left out of the handlebar when the tool device is received in the handlebar.

In an embodiment, the tool device further has an adaptor connected to the connector and the tool respectively.

In an embodiment, the tool device further has an adaptor connected to the threaded shank of the bolt of the connector and the tool respectively.

The present invention provides the tool assembly for bicycle, which may be stored in the bicycle without changing the structure of the bicycle.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
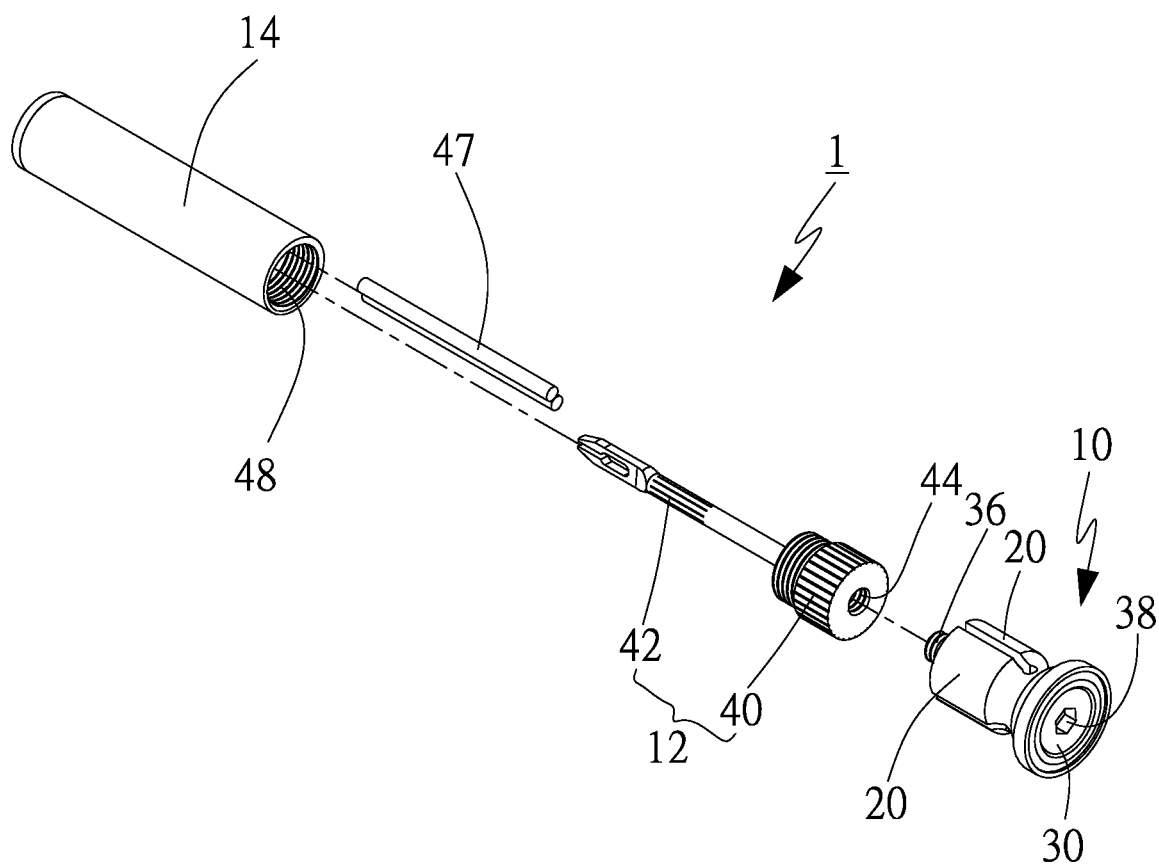
FIG. 1 is an exploded view of a first preferred embodiment of the present invention.

As shown in FIG. 1, a tool assembly 1 of the first preferred embodiment of the present invention, which is received in a handlebar of a bicycle (not shown), includes a connector 10, a tool device 12, and a cap 14.

Figure 2:
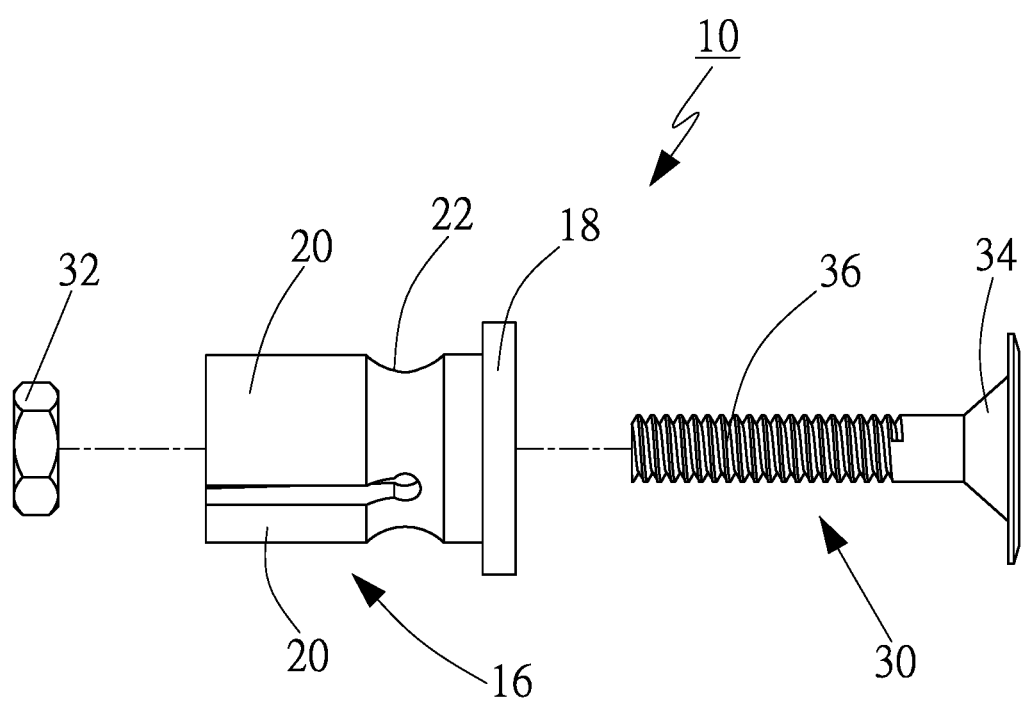
FIG. 2 is an exploded view of the connector of the first preferred embodiment of the present invention.
Figure 3:
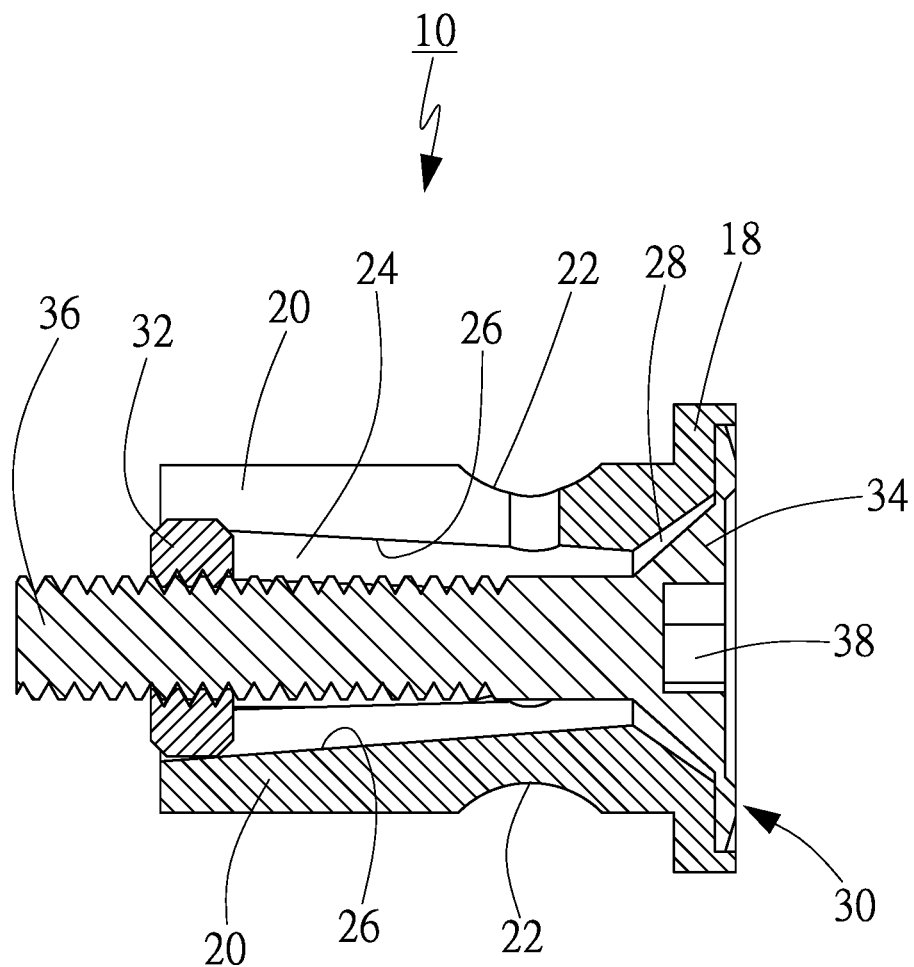
FIG. 3 is a sectional view of the connector of the first preferred embodiment of the present invention, showing the flexible plates not extended.

As shown in FIGS. 2 and 3, the connector 10 is made of a flexible material, such as rubber, having a main member 16 and a driving member. The main member 16 has a flange 18 at an end thereof and an expanding portion. In the present embodiment, the expanding portion includes plurality of flexible plates 20, which are separated from each other, and each of which has a recess 22 to increase flexibility. A space 24 is formed within the flexible plates 20. Each of the flexible plates 20 has an inclined surface 26 at an inner side thereof which makes a diameter of the space 24 gradually narrow from a distal end to a proximal end. The flange 18 has a bore 28 communicated with the space 24. In the present embodiment, the driving member includes a bolt 30 and a nut 32. The bolt 30 has a head 34 and a threaded shank 36. The threaded shank 36 is inserted into the space 24 via the bore 28, and the head 34 is received in the bore 28. A suitable tool (not shown) is used to engage the head 34 for turning the bolt 30. In present preferred embodiment, the head 34 has a hexagonal slot 38 to be engaged by a hex wrench (not shown). The nut 32 engages the threaded shank 36 of the bolt 30 and abuts against the inclined surfaces 26 of the flexible plates 20 to be moved related to the threaded shank 36 when the bolt 30 is turned.

Figure 4:
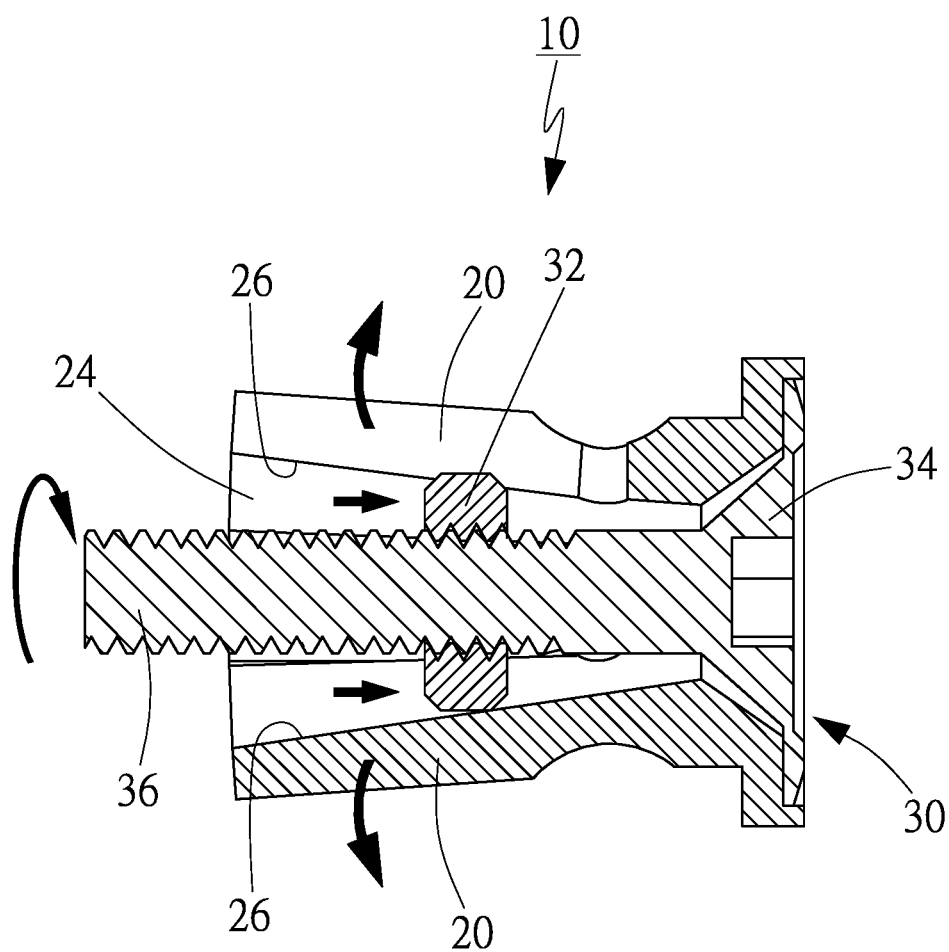
FIG. 4 is a sectional view of the connector of the first preferred embodiment of the present invention, showing the flexible plates extended.

As shown in FIG. 4, when the bolt 30 is turned to move the nut 32 inwardly, the flexible plates 20 of the connector 10 are extended outwardly, and the flexible plates 20 will flex to their initial conditions (shown in FIG. 3) when the bolt 30 is turned in a reverse direction to move the nut 32 outwardly.

As shown in FIG. 1, the tool device 12 has an adaptor 40 and a tool 42. The adaptor 40 has a threaded hole 44 (see FIG. 1) on an end to be connected to the threaded shank 36 of the bolt 30 of the connector 10, and the tool 42 is connected to an opposite end of the adaptor 40. In the present preferred embodiment, the tool 42 is a needle tool which is used to insert a plug into a hole of a tubeless tire for repairing punctures in the tubeless tire. The adaptor 40 further has a threaded section 45 proximal to the end having the tool 42. The tool 42 is fixed to the adaptor 40, and the adaptor 40 is removable from the connector 10 by turning the adaptor 40.

Figure 5:
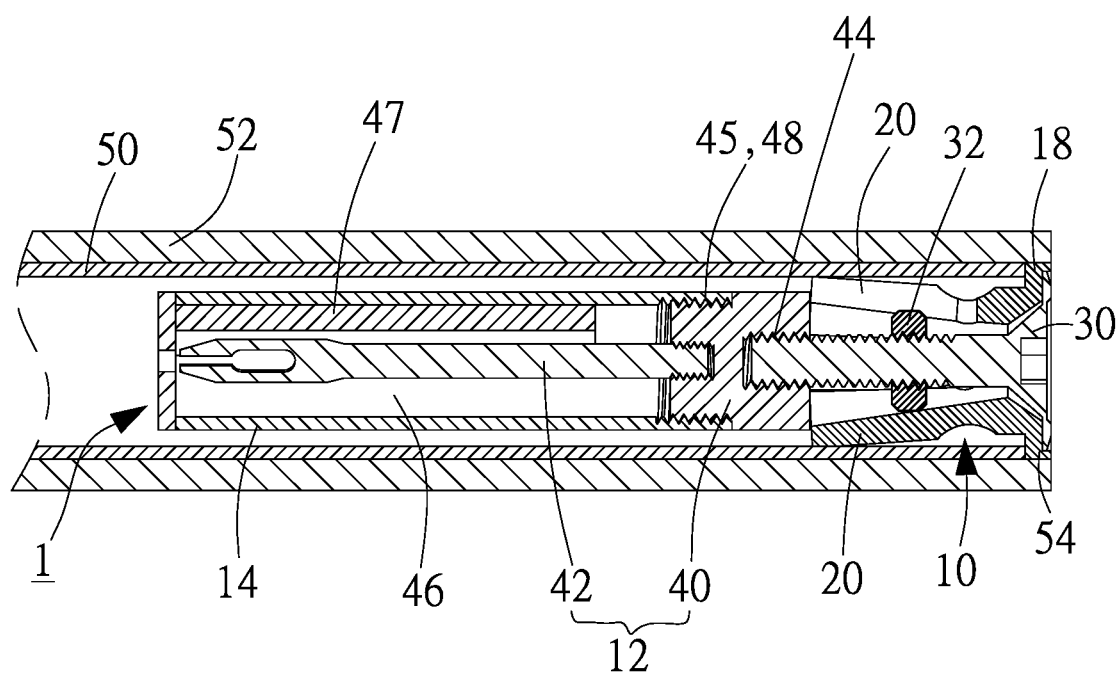
FIG. 5 is a sketch diagram of the first preferred embodiment of the present invention, showing the tool assembly stored and fixed in the handlebar.

As shown in FIG. 5, the cap 14 has a chamber 46 therein and a threaded section 48 on a sidewall of the chamber 46 adjacent to an opening of the chamber 46. The cap 14 is connected to the adaptor 40 of the tool device 12 by engaging the threaded sections 44, 48 to receive the tool 42 of the tool device 12 in the chamber 46. In the present preferred embodiment, an accessory 47, which has plugs for repairing punctures in the tubeless tire, is received in the chamber 46.

FIG. 5 shows the tool assembly 1 of the first preferred embodiment is inserted into a handlebar 50 of the bicycle with the flange 18 left out of the handlebar 50 and against an end of the handlebar 50. A grip 52 is fitted to the handlebar 50 with an opening 54 at an end thereof. The opening 54 of the grip 52 is slightly greater than the flange 18 to receive the flange 18 therein. When the tool assembly 1 is inserted into the handlebar 50 as described above, the cyclist may turn the bolt 30 by a hex wrench (not shown) to move the nut 32 inwardly, so that the flexible plates 20 are extended to press the handlebar 50. As a result, the tool assembly 1 is firmly stored in the handlebar 50. When the cyclist wants to use the tool 42, he/she just uses the hex wrench (not shown) to turn the bolt 30 in a reverse direction. The nut 32 will be moved outwardly, and the flexible plates 20 will return to their initial conditions and no longer press the handlebar 50. As a result, the tool assembly 1 is free to be taken out from the handlebar 50.

Figure 6:
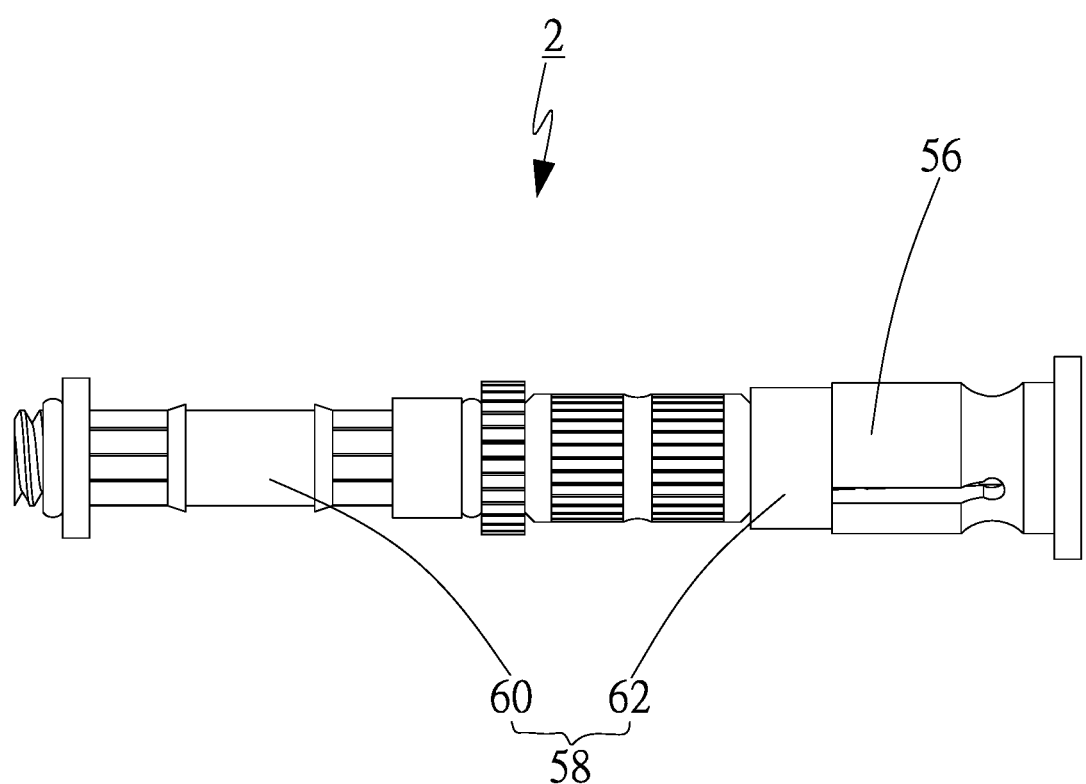
FIG. 6 is a perspective view of a second preferred embodiment of the present invention.

FIG. 6 shows a tool assembly 2 of the second preferred embodiment of the present invention, which is similar to the tool assembly 1 of the first preferred embodiment, having a connector 56 and a tool device 58. The different part of the second preferred embodiment includes a tool 60 of the tool device 58 is a valve for inflation and the tool 60 is detachably connected to an adaptor 62. Furthermore, no cap is provided in the second preferred embodiment. The function and the way of operation of the tool assembly 2 of the second preferred embodiment are the same as the first preferred embodiment, so we do not describe it again.

The present invention provides the tool assembly for bicycle, which may be stored in the bicycle without changing the structure of the bicycle.

It must be pointed out that the embodiments described above are only some preferred embodiments of the present invention. All equivalent structures which employ the concepts disclosed in this specification and the appended claims should fall within the scope of the present invention.

What is claimed is:

1. A tool assembly, which is stored in a handlebar of a bicycle, comprising:
a connector having a main member and a driving member, wherein the main member has an expanding portion, and the expanding portion includes a plurality of flexible plates, which are driven by the driving member and extendable to enlarge a diameter of the expanding portion; and
a tool device connected to the connector, wherein the tool device has a tool;
whereby the connector and the tool device are intended to be received in the handlebar, and the expanding portion presses the handlebar when the expanding portion is enlarged by the driving member to fix the tool assembly to the handlebar.

2. The tool assembly of claim 1, further comprising a cap detachably connected to the tool device to receive the tool therein.

3. The tool assembly of claim 1, wherein each of the flexible plates is provided with a recess.

4. The tool assembly of claim 1, wherein the driving member of the connector includes a bolt and a nut; the bolt is connected to the main member, and a threaded shank of the bolt extend to a space within the flexible plates; the nut is received in the space and abutted against the flexible plates; the nut engages the threaded shank of the bolt, so that the nut is moved related to the threaded shank to extend the flexible plates when the bolt is turned.

5. The tool assembly of claim 4, wherein each of the flexible plates has an inclined surface at an inner side thereof which makes a diameter of the space within the flexible plates gradually narrowed.

6. The tool assembly of claim 4, wherein the tool device further has an adaptor connected to the threaded shank of the bolt of the connector and the tool respectively.

7. The tool assembly of claim 1, wherein the main member of the connector has a flange at an end thereof, and the flange is left out of the handlebar when the tool device is received in the handlebar.

8. The tool assembly of claim 1, wherein the tool device further has an adaptor connected to the connector and the tool respectively.

* * * * *